United States Patent
Duffin et al.

(10) Patent No.: US 8,511,181 B2
(45) Date of Patent: Aug. 20, 2013

(54) VARIABLE TORQUE RATE TEST JOINT

(75) Inventors: Adrian James Duffin, Warwickshire (GB); John Edward Burton, Birmingham (GB); Peter William Everitt, Leicestershire (GB); Neil McDonald, Staffordshire (GB); Andrew Wilkins, Derby (GB)

(73) Assignee: Crane Electronics Limited, Hinckley, Leicestershire (GB)

( * ) Notice: Subject to any disclaimer, the term of this patent is extended or adjusted under 35 U.S.C. 154(b) by 0 days.

(21) Appl. No.: 13/510,462

(22) PCT Filed: Nov. 17, 2010

(86) PCT No.: PCT/GB2010/002122
§ 371 (c)(1),
(2), (4) Date: Aug. 3, 2012

(87) PCT Pub. No.: WO2011/061494
PCT Pub. Date: May 26, 2011

(65) Prior Publication Data
US 2013/0125666 A1   May 23, 2013

(30) Foreign Application Priority Data
Nov. 17, 2009   (GB) .................................. 0920026.2

(51) Int. Cl.
*B25B 23/14* (2006.01)
(52) U.S. Cl.
USPC .................................................... 73/862.22
(58) Field of Classification Search
USPC .......................................... 73/862.21–862.23
See application file for complete search history.

(56) References Cited

U.S. PATENT DOCUMENTS

| 4,127,788 | A | 11/1978 | Daugherty | |
|---|---|---|---|---|
| 5,152,182 | A | * 10/1992 | Searle | ........................ 73/862.23 |
| 6,237,399 | B1 | 5/2001 | Shivaram et al. | |
| 2004/0073384 | A1 | 4/2004 | Kadner | |
| 2007/0017295 | A1 | 1/2007 | Ohta et al. | |

FOREIGN PATENT DOCUMENTS

| CN | 101465043 | 6/2009 |
|---|---|---|
| DE | 102006020325 A1 | 11/2007 |
| DE | 102006029556 A1 | 12/2007 |
| EP | 0 780 661 A1 | 6/1997 |

(Continued)

*Primary Examiner* — Lisa Caputo
*Assistant Examiner* — Octavia D. Hollington
(74) *Attorney, Agent, or Firm* — Alicia M. Passerin, Esq.; Alan G. Towner, Esq.; Pietragallo Gordon Alfano Bosick & Raspanti, LLP (57) ABSTRACT

In a variable torque rate test joint, screw-threaded first and second elements are rotated relative to one another by a tool under test. At least one spring beam is cantilevered over a pivot point to exert an axial force between the first and second elements and the torque rate of the test joint can be varied by moving the pivot point to change the axial force. The first element may be a shaft that is fixed during testing and the second element is a nut rotatably mounted on the shaft, whereby the element rotated by the tool has a minimal moment of inertia. Whichever of the first and second elements is held stationary during the test may be mounted in a hub that is locked during the test but can be rotated at the end of the test to reset the test joint. Measurements may be made of the torque and the rotation angle to derive an actual torque rate of the joint, which allows correction of errors by moving the pivot point.

31 Claims, 4 Drawing Sheets

(56) References Cited

FOREIGN PATENT DOCUMENTS

| | | |
|---|---|---|
| GB | 2 438 874 A | 12/2007 |
| JP | 60060525 | 4/1985 |
| JP | 6034464 | 2/1994 |
| JP | 2004101246 | 4/2004 |
| JP | 2006010543 | 1/2006 |
| RU | 2 042 117 C1 | 8/1995 |
| SU | 1496855 A1 | 7/1989 |
| WO | 2005059496 | 6/2005 |
| WO | 2008099204 A2 | 8/2008 |

* cited by examiner

VARIABLE TORQUE RATE TEST JOINT

CROSS-REFERENCE TO RELATED APPLICATIONS

This application is a U.S. National Stage Application under 35 U.S.C. Section 371 of PCT International Application No. PCT/GB2010/002122, filed Nov. 17, 2010 which is incorporated herein by reference as if set forth in its entirety.

FIELD OF THE INVENTION

The invention relates to test joints for the performance testing of rotary tools for threaded fasteners. The invention provides such a test joint with a variable torque rate.

BACKGROUND ART

The bolted joint is a very important fastening method in engineering assemblies. It works by screwing together two or more parts with a bolt and nut. The bolt or nut may be made integral with one of those parts or the bolt may pass through a bore in both parts to engage the nut on the opposite side. The screwing action acts through co-operating threads to draw the bolt head and nut together so that their faces produce a clamping force on the parts between them. As the nut is tightened the material of the bolt shaft stretches and the material forming the parts being fastened compresses so that the tension force in the bolt equals the compression force in the joint. The clamping force should be kept within defined limits: if the clamping force is too low, the joint will be loose; if the clamping force is too high, there is a risk that the fastening may fail or the joined components may be damaged.

Although it would be desirable to measure the clamping force directly, it is very difficult to measure the precise extent of the stretching or compression in the joint, and therefore to deduce the magnitude of the clamping force. Experiments are therefore performed with force washers to arrive at a corresponding value for the torque applied to the fastener, which is easy to measure as a surrogate for the actual clamping force. Once that torque value has been established for a given type of fastener, it may be replicated as a reliable means of creating a bolted joint with a known clamping force, between specified limits. However, to replicate reliably the amount of torque imparted during tightening of the joint, it becomes essential that the rotary fasteners used to tighten the joints are also periodically checked, to make sure they give a correct indication of torque before they are used on an assembly line.

International standards have been set up to specify performance test routines for checking the calibration of rotary tools before they are used on assembly lines to fasten bolts and similar threaded fasteners. These performance test methods use Joint Rate Simulators (JRSs), which simulate the torque pattern that is experienced as a joint is tightened. To a first approximation, as a typical joint is tightened, the torque increases linearly with the angle turned by the screw thread. A JRS uses this characteristic to provide a test piece on which the tool will fit, such that when the tool applies torque to turn the test piece, that torque increases with the angle through which the test piece turns. The rate of increase of torque with increasing angle is referred to as the torque rate. The angle through which the joint must be turned to tighten it fully depends on the torque rate of the joint and on the torque applied. For a "hard joint", full tightening is accomplished in a fraction of a revolution. In contrast, in a "soft joint", full tightening is accomplished over a much greater angular range of movement, possibly several complete several revolutions of the fastener.

A tool is tested by setting the JRS to the desired level of torque rate and applying the tool to the bolt head of the JRS via an intermediate torque sensor. For the desired level of torque rate, the torque reading of the tool can be compared with the torque reading of the torque sensor to confirm that the tool is measuring torque correctly or to calibrate the tool. Any complete performance testing routine comprises a number of repeated tightening cycles of the test joint, with the results being averaged or statistically analyzed.

International patent application WO 2008/099204 describes a variable torque rate test joint (i.e. a JRS), which comprises a bolt that screws into a threaded bore of a test rig. A torque rate adjustment device comprises at least one spring beam that is anchored to a reaction point at one end and flexes as it extends in cantilever over a pivot point. The other end of the beam exerts axial pressure on a collar that acts against the head of the bolt to provide a force that resists turning of the bolt. The amount of flexure can be adjusted to vary the axial force and hence the torque rate of the test joint by varying the distance between the pivot point and the rotary axis of the bolt. That test joint was an improvement over earlier test joints because the test bolt upon which the tool acted had a relatively small moment of inertia, which was comparable to the actual moment of inertia of a genuine fastener bolt. Therefore the joint provided a more realistic simulation of the conditions under which the tool would be used. The correct moment of inertia is a particularly important consideration when the test joint is used for the performance testing of impulse drive tools. These tools rely on the transfer of pulses of torque, each pulse being a few milliseconds in duration, with many pulses per second being applied to the joint. If the joint has a large moment of inertia, then the tool cannot transfer enough energy to make the joint initially free-turn before the joint tightens, and the tool can then stall. A JRS that has a moment of inertia that is not matched to that of the real joint under simulation may thus not give true results for impulse tools.

In the test joint described in WO 2008/099204, the test bolt must have a certain minimum length in order to pass through the thickness of the apparatus. Therefore the moment of inertia of the test bolt cannot be reduced indefinitely and that type of test joint cannot be used to simulate smaller nuts and bolts accurately. A further problem is that the torque sensor located between the rotary tool and the test bolt adds to the moment of inertia of the moving parts upon which the tool must act.

As previously indicated, a testing programme for a rotary tool typically involves a large number of individual tests over which the results are averaged, for example a series of 50 tests. WO 2008/099204 describes that, at the end of each test, the clamping force on the test joint may be released and means such as a return spring or an electric motor may be used to rotate the test bolt back to its starting position for a further test in the series to be carried out. However, many rotary tools cannot be rotated in reverse so they would have to be removed from the bolt head after each test, which is laborious and inefficient. A better way of resetting the test joint at the end of each test in the series is therefore needed.

The measurement of torque is not a perfect substitute for the measurement of clamping force, which is the real quantity of interest. The relationship between torque and clamping force may vary with temperature and as a result of varying friction between the joint components. Friction depends on the amount of lubrication and may also change as the joint ages and becomes worn smooth by repeated use, which is a particular problem in a test joint. It is therefore desirable to provide more direct measurements of the clamping force and/or to be able to compensate for deviations from the expected torque rate of the test joint.

THE INVENTION

All aspects of the invention share certain common features of a variable torque rate test joint, namely:
a first element having an externally screw threaded shaft;
a second element having an internally screw threaded bore;
the screw threads of the first and second elements being engaged with one another so that relative rotation between the first and second elements can be effected by a tool under test; and
means for exerting a variable force between the first and second elements in the axial direction of the shaft in order to vary the torque rate of the test joint, the force-exerting means comprising:
a collar encircling the shaft and engaging one of the first and second elements;
at least one spring beam mounted at a reaction point, cantilevered over a pivot point and engaging the collar so as to exert a force on the collar in the axial direction; and
means for varying the distance between the pivot point and the central axis of the shaft in order to vary the axial force exerted by the spring beam on the collar.

A first aspect of the invention is characterized in that the first element is fixed against rotation during testing of a tool; and the second element is a nut mounted for rotation on the shaft of the first element when acted on by a tool under test.

By inverting the arrangement of the prior art, so that the fixed part of the test joint comprises the threaded shaft and the moving component is a nut, the moment of inertia of the part that is moved by the rotary tool can be reduced as required, in order to match as closely as possible the fastening component being simulated.

A second aspect of the invention is characterized in that: one of the first and second elements is a rotary element that is rotated by a tool under test; the other of the first and second elements is a stationary element that is held by a locking mechanism to prevent it from rotating during the testing of a tool; and the locking mechanism can be deactivated at the end of a test to allow rotation of the stationary element.

The rotary element of the test joint, which is acted on by the rotary tool under test, may be a bolt as in the prior art. The "stationary" element is then a nut that is held fixed against rotation by the locking mechanism while an individual test of the tool is carried out in the conventional manner, i.e. by screwing the bolt (typically clockwise as viewed from above the bolt head) into the nut to tighten the test joint. At the end of that test, the locking mechanism is deactivated to allow the test joint to be reset. That is done by turning the previously stationary nut (also in the clockwise direction as viewed from above) to unscrew it from the bolt and loosen the joint until the nut and the bolt head regain their initial separation. This can be achieved while the bolt head remains stationary so the rotary tool does not have to run in reverse or be removed from the head.

Alternatively, the rotary element of the test joint may be a nut in accordance with the first aspect of the present invention. The "stationary" element is then a bolt, the head of which is held fixed against rotation by the locking mechanism while an individual test of the tool is carried out by rotating the nut on the bolt shaft. At the end of the test, the locking mechanism is deactivated to allow the test joint to be reset.

That is done by turning the previously stationary bolt to unscrew it from the nut and loosen the joint until the nut and the bolt head regain their initial separation. This can be achieved while the nut remains stationary so the rotary tool does not have to run in reverse or be removed from the nut.

Preferably a motor is provided to effect the rotation of the normally stationary element at the end of each test in order to reset the apparatus. The "stationary" nut or bolt may be held in a cam that is shaped to engage with the locking mechanism and is capable of being rotated by the motor. The locking mechanism preferably comprises two or more locking arms, which act against the cam in a tangential direction and which can be retracted to deactivate the locking mechanism.

As part of this second aspect of the invention, there is also provided a method of resetting a test joint as just described.

The shaft of the first element may comprise a torque sensor for directly measuring the torque imparted to the shaft by a tool under test.

The test joint accordingly has an inbuilt torque sensor, thereby removing the need to insert a separate torque sensor between the tool and the test joint. That not only saves the cost and complexity of a separate sensor but it reduces the moment of inertia of the components that have to be turned by the tool and leads to a more accurate simulation.

The torque sensor may comprise at least one strain gauge mounted on the shaft. As the test joint is tightened by the rotary tool being tested, the shaft of the first element is both stretched and twisted by the interaction action of the mutually engaging threads and by the tension exerted on the shaft as the joint resists compression. That is true whether it is the nut or the bolt that is acted on by the tool. Thus a strain gauge mounted along the shaft will be extended as the joint is tightened and can give a measure of the torque experienced by the shaft. Preferably at least two strain gauges are provided. The shaft may be formed in two parts—one carrying the thread and the other carrying the strain gauges—so that if the thread becomes worn or damaged, the thread-carrying part of the shaft can be replaced without having to replace the more expensive strain gauges.

The variable torque rate test joint may comprise a strain gauge mounted on the spring beam. Because the spring beam is responsible for delivering the variable axial force between the first and second elements of the test joint, the amount of bending in the beam for a given position of the pivot point is related mathematically to the level of the clamping force in the test joint. This can provide an alternative and more direct measure of the clamping force than is achieved by the measurement of applied torque. It can be used either to replace the torque measurement or to confirm that the expected relationship between torque and clamping force holds for the tool in question.

A further aspect of the invention provides a method of adjusting the test joint, which is characterized by the steps of:
measuring the relative rotation between the first and second elements of the test joint during a test;
measuring the torque applied to the test joint during the test;
deriving an actual torque rate from the measured rotation and the measured torque; and
adjusting the distance between the pivot point and the central axis of the shaft to compensate for any error between the actual torque rate and a desired torque rate.

The torque rate set in the variable torque rate test joint depends on the position of the pivot point(s) for the spring beam(s). The expected torque rate can be predicted from the force required to bend the portion of the beam that is cantilevered beyond the pivot point. However, the torque rate may deviate from the predicted value because of variations in conditions such as friction and temperature. In accordance with the invention, the test joint is provided with means for measuring the actual angle through which the test joint rotates, which in conjunction with the measured torque allows the actual torque rate of the test joint to be determined. The position of the pivot points can then be adjusted to compensate for any error.

The various aspects of the invention described herein may be used individually, all together, or in any combination. All such combinations are within the scope of this disclosure, even if not specifically described or illustrated.

DETAILED DESCRIPTION

Figure 1:
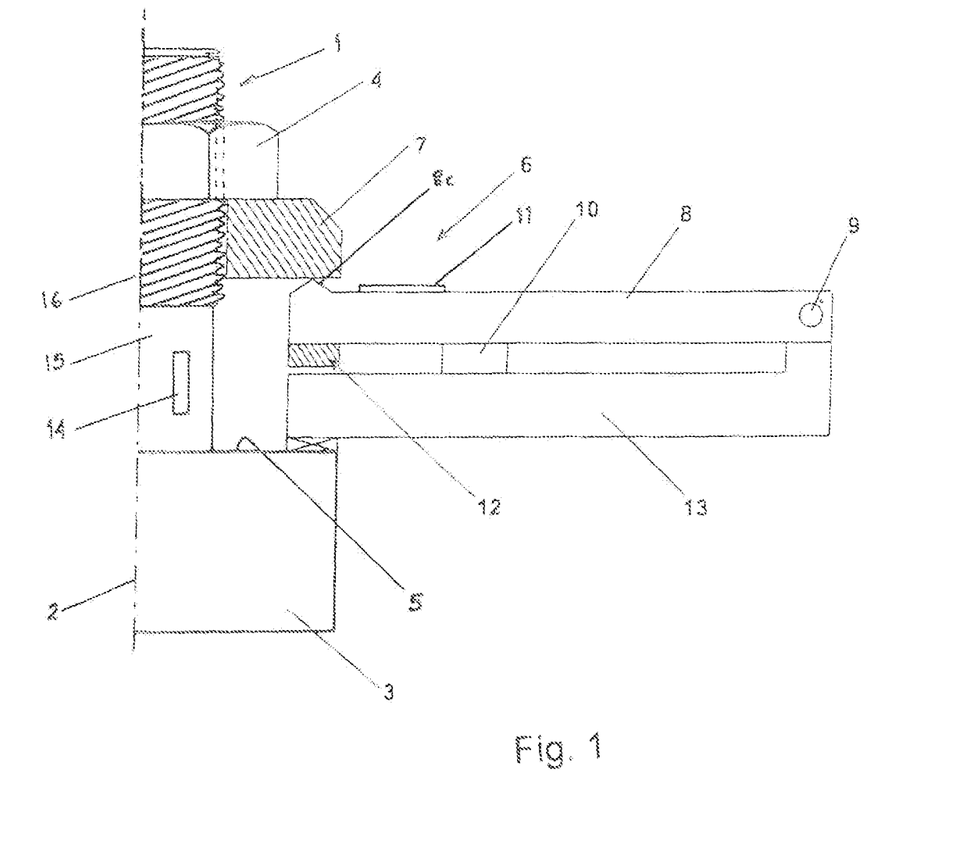
FIG. 1 is a schematic sectional view through one half of a test joint embodying several aspects of the invention.

Referring first to FIG. 1, the test joint comprises a threaded shaft 1 that is integral with or fixedly mounted in a test rig 3. Threaded on the shaft 1 is a nut 4 that is suitable for rotating by a rotary tool (not illustrated) that is to be tested using the test joint. The nut 4 is the only component of the test joint that rotates during a test and its relatively small size and mass naturally give it a low moment of inertia.

Between the nut 4 and a shoulder 5 of the test rig is a torque-rate adjustment device indicated generally as 6. The torque-rate adjustment device comprises a collar 7 encircling the shaft 1 beneath the nut 4, and one or more spring beams 8 that extend generally radially inwards from a reaction point 9. Each spring beam 8 extends over a pivotal bearing member 10, so that a cantilevered free end 8c lies beneath the collar 7. Although not illustrated in FIG. 1, means are provided for varying the distance between the pivotal bearing member 10 and a central axis 2 of the shaft 1. Such means may include a stepper motor and lead screw controlling the linear position of the pivotal bearing member 10, and a linear displacement voltage transducer providing closed loop feedback to that stepper motor.

As the nut 4 is screwed down the threaded shaft 1 by the rotary tool, the nut 4 urges the collar 7 against the free end 8c of the spring beam 8. The spring beam 8 bends about the pivot member 10 and exerts an axially-directed reaction force on the underside of the collar 7. The force increases as the test joint is tightened and thus simulates the clamping force of a joint when it is secured by a threaded fastener. The rate at which the force increases depends on the length over which the spring beam 8 is able to bend and hence on the distance between the pivot member 10 and the free end 8c of the spring beam. Thus the torque rate of the test joint can be varied by varying the radial position of the pivot member 10. Although not shown in FIG. 1, it is preferred that at least two spring beams 8, or two branches of a single spring beam, should engage the underside of the collar 7 at points located symmetrically about the axis of the shaft 1, in order to balance the forces on the collar 7. As exemplified below, the collar 7 may be any simple or composite component that is suitable for transmitting the axial force from the beams 8 to the nut 4, and is not necessarily circular in shape.

FIG. 1 also illustrates an optional stop member 12 which would be a solid metal shoulder on the spring beam 8, intended to prevent over-flexure of the spring beam 8 if the joint were to be over-tightened. As shown in FIG. 1, the stop member 12 is a solid metal member affixed beneath the spring beam 8. Other possible positions for the stop member or other arrangements to prevent over-tightening of the test joint can readily be conceived.

The reaction point 9 in FIG. 1 is shown as a pivot, according to which the spring beam 8 is anchored to a bottom plate 13 but is permitted to flex about the pivotal bearing member 10. The bottom plate 13 may be a work table of the test rig formed integrally with the portion of the rig 3 indicated in FIG. 1, or it may be formed separately from the rig 3. Instead of a complete work table, the bottom plate 13 may be a reaction beam extending generally parallel to the spring beam 8. That reaction beam may itself be a spring beam.

The test joint of FIG. 1 is used for the performance testing of rotary tools for threaded fasteners according to conventional procedures. A torque and angle measurement device, such as that sold by Crane Electronics Ltd under the trade mark CHECKSTAR, is placed over the nut 4 and is driven by the drive head of the rotary tool (not shown) under performance test. That rotary tool may be a torque wrench or nutrunner, and may be manually actuated or power actuated. If power actuated, then it could be electrically or pneumatically driven, continuously or pulsatingly as an impact wrench. As the nut 4 is tightened, the torque and angle measurement device sends a stream of torque-rate information to a central store such as the memory of a computer, and from that information the correct calibration of the rotary tool can be tested under true performance conditions. Suitable performance testing algorithms are discussed for example in relation to impulse tools in international patent application WO 98/10260.

As an alternative to using a torque measurement device between the rotary tool and the nut 4, in accordance with one aspect of the present invention the shaft 1 may incorporate an in-built torque sensor 14. The torque sensor 14 may comprise one or more strain gauges on an unthreaded portion 15 of the surface of the shaft 1, which are aligned so as to measure the twisting and/or stretching of the shaft 1 as torque is applied to the test joint 1. The use of an in-built torque sensor avoids the need to use a separate torque measurement device, and in particular it avoids the need for the rotary tool under test to rotate the extra mass of the separate torque measurement device.

Because the test joint is tightened repeatedly in the normal course of testing, the threads of the nut 4 and shaft 1 are liable to become worn or damaged and need to be replaced. In order to allow the replacement of the threaded shaft 1 without having to replace the relatively expensive strain gauges 14, the threaded portion 16 of the shaft may be made separate from the unthreaded portion 15 that carries the gauges 14, the two parts being releasably locked together in any conventional manner so as to act as a single unit while the test joint is being used.

The in-built torque sensor 14 is not applicable only to embodiments of the invention in which the rotary element of the test joint is a nut 4. It can also be used in test joints such as that disclosed in WO 2008/099204, in which the rotary element is a bolt that screws into a threaded bore in the test rig. The torque sensor 14 can be built into the shaft of the bolt, for example by applying one or more strain gauges to a preferably unthreaded part of the shaft. Because the bolt rotates relative to the test rig during testing, means such as a sliding contact must be provided for conducting the electrical signal output by the moving torque sensor to the stationary rig.

Figures 2, 3, 4:
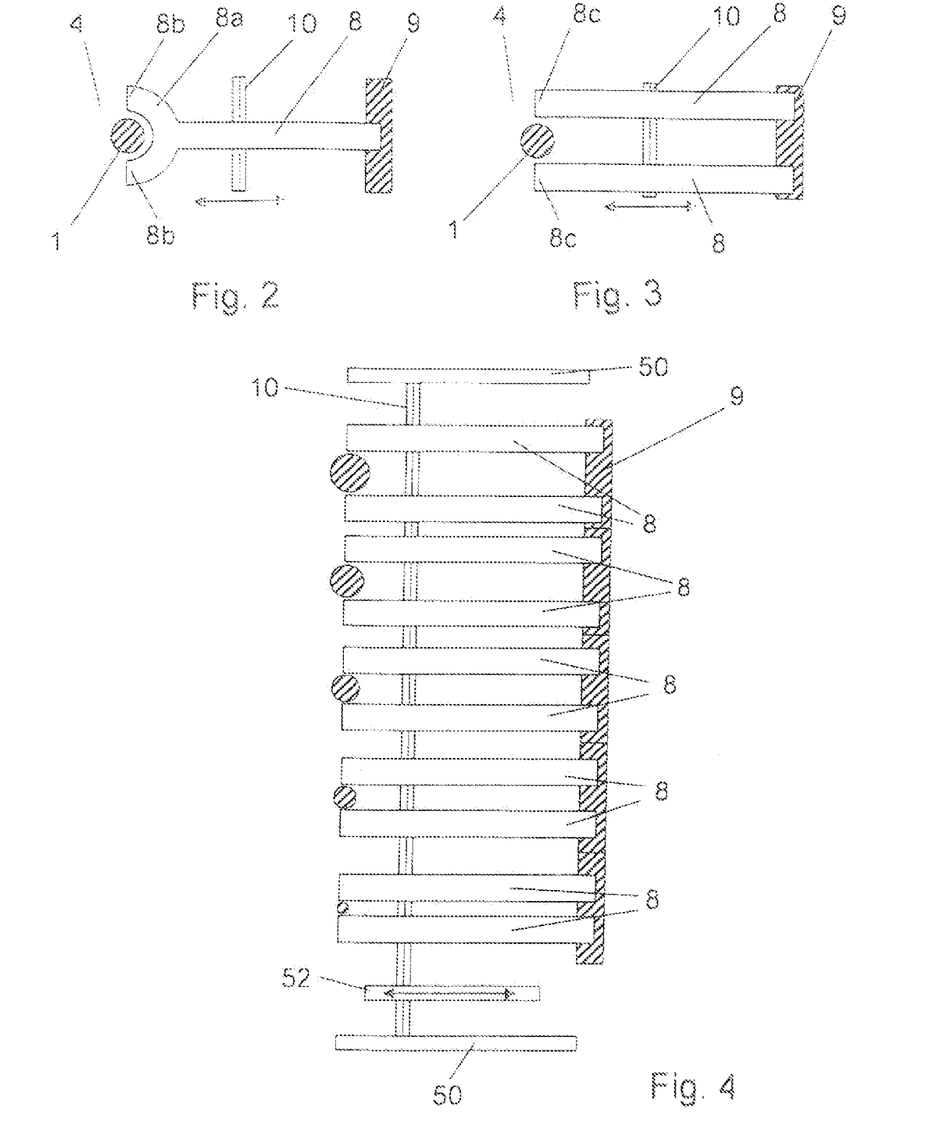
FIG. 2 is a schematic plan view of a test joint comprising a single spring beam.
FIG. 3 is a schematic plan view of a test joint comprising a pair of spring beams.
FIG. 4 is a schematic plan view of a set of test joints of different sizes sharing a common pivot system.

FIGS. 2 and 3 illustrate schematically the preferred arrangement of spring beams 8 in a test joint according to the invention, in which there is a single beam 8 or a pair of beams 8 located on the same side of the shaft. This makes the apparatus more compact than if a plurality of radially oriented beams were arranged symmetrically about the shaft. It also allows the use of a single pivot member 10, reducing the number of components required and avoiding any possibility that different pivot members 10 may be at different distances from the axis.

In FIG. 2 there is only one spring beam 8 which has a bifurcated head 8a which extends around just over half of the shaft 1. The collar 7 of the torque-rate adjustment device of the previous embodiments is not illustrated in FIG. 2 but would be present between the nut 4 and the spring beam 8. The end portions 8b of the bifurcated spring beam 8 contact the collar 7 along a diameter of the collar that passes through the axis of the shaft 1 and is perpendicular to the length of the spring beam 8. As a result, the contact points remain symmetrically disposed about the shaft 1 as the end of the spring beam 8 moves up and down and the forces exerted by the beam 8 through the collar 7 on the nut are balanced so as to be directed purely in the axial direction.

In FIG. 3 there is a pair of identical spring beams 8 which extend in parallel from a common reaction member 9 over a common pivotal bearing member 10 to engage beneath the collar 7 (not illustrated in FIG. 3) that lies beneath the nut 4. Note that, although each beam 8 is not strictly radially aligned with the shaft, the two beams are disposed at equal distances on opposite sides of a radius and parallel to it. Just as in FIG. 2, the free ends 8c of the two spring beams 8 transmit a reaction force to the nut being tightened that is symmetrical on diametrically opposite sides of the shaft 1.

FIG. 4 illustrates, again schematically, an array of five variable torque-rate test joints according to the invention, having a common reaction member 9 and a common pivotal bearing member 10. The pivotal bearing member 10 is accurately guided between slideways 50 at each end of the pivotal bearing member 10, the precision of machining being sufficient to ensure that the pivotal bearing member 10 is always held strictly perpendicular to the longitudinal axes of the spring beams 8. Its lateral movement is preferably controlled by a ball screw actuator 52 driven by a stepper motor (not shown) under the control of a computer. Each pair of spring beams 8 interacts, through a collar (not shown) with a corresponding nut 4 as described above with reference to FIG. 3. The five nuts 4 are, however, of different sizes corresponding to a range of sizes of fasteners used in manufacturing industry, each having a suitable moment of inertia to simulate an actual fastener. Each beam pair associated with one of the five test joints has a different spring constant, whereby each test joint can be adjusted over a corresponding range of torque rates by positioning the common pivotal bearing member 10 appropriately.

Returning to FIG. 1, a further strain gauge 11 is shown on the upper surface of the cantilevered portion of the spring beam 8. The strain gauge 11 provides a measurement of the degree of bending to which the spring beam 8 is subjected as the test joint is tightened. From a knowledge of the shape and mechanical properties of the beam 8 and the position of the pivot member 10, it is possible to calculate the axial force exerted by the spring beam 8 on the collar 7 for a given degree of bending. This provides a more direct measure of the actual clamping force experienced by the test joint than does the surrogate measurement of torque. Such measurements may be used to ensure that the torque applied by the tool under test correlates as expected with the clamping force experienced by the joint, or to calibrate the torque readings of a rotary tool against the desired level of clamping force for use in applications where the precise control of clamping force is critical. There may be one or more such strain gauges 11 on a single spring beam 8 or on each beam.

Figure 5:
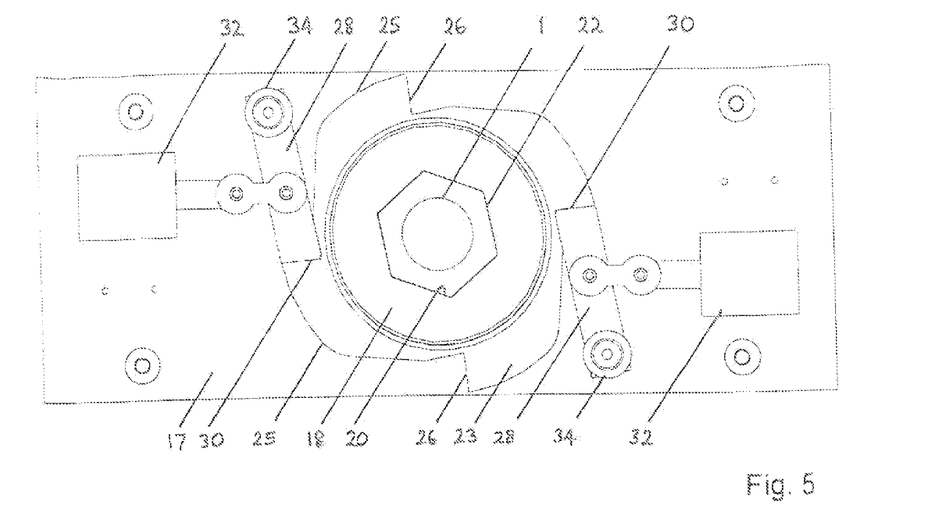
FIG. 5 is a plan view of a locking and release mechanism for a test joint in accordance with an aspect of the invention.
Figure 6:
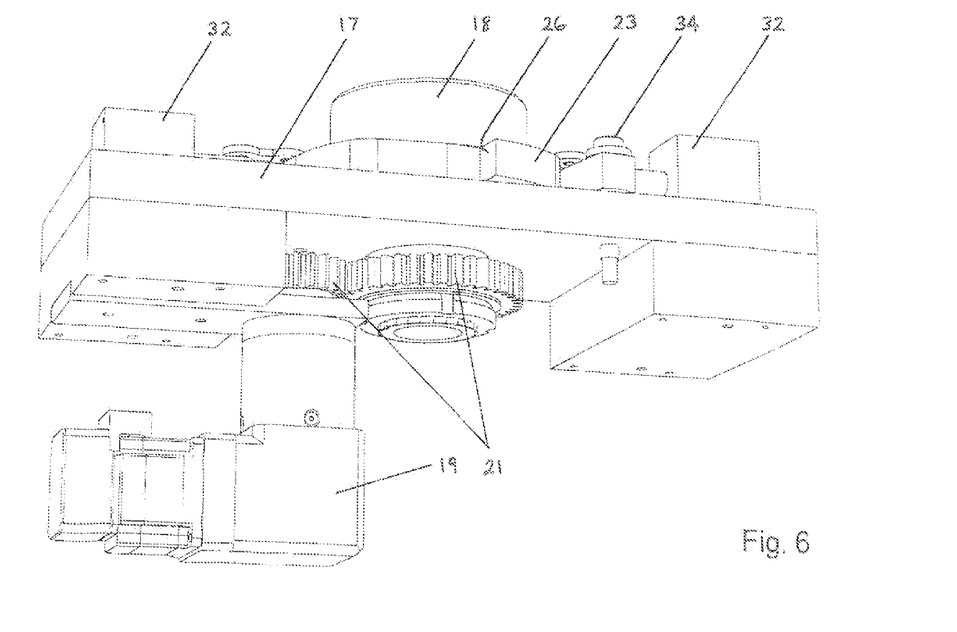
FIG. 6 is a perspective view showing the underside of the locking and release mechanism of FIG. 5.

FIGS. 5 and 6 show a locking and release mechanism for use with a test joint as previously described. The locking and release mechanism allows the joint to be easily returned to its initial position after each test, thereby improving the efficiency of a testing programme that consists of a long series of repeated individual tests. On a baseplate 17 that is fixed to the test rig 3 there is mounted a rotary hub 18, which can be driven to rotate about its axis by an electric motor 19 acting through a set of gears 21. At the centre of the hub 18 is a recess 20, which is sized and shaped to receive a bolt head 22 and to hold it against rotation relative to the hub 18. The bolt head 22 is part of a bolt that forms the stationary element of the test joint fastener, and that also comprises the threaded shaft 1 on which is mounted the nut 4 that forms the rotary element of the test joint. As illustrated, the bolt head 22 and the recess 20 have a conventional hexagonal shape but that is not essential provided that relative rotation between them is prevented. In principle, the bolt head 22 could even be formed integrally with the hub 18 so that the threaded shaft 1 simply projected from the face of the hub 18, but in practice this would mean that the entire hub 18 had to be replaced when the thread of the shaft 1 became worn.

Around the periphery of the hub 18 is a cam 23 comprising four outwardly facing, curved cam surfaces 25, alternating with four generally circumferentially facing locking faces 26. A pair of locking arms 28 are pivotally mounted on the test rig 3 at opposite sides of the hub 18 and are arranged so that ends 30 of the locking arms can simultaneously engage an opposing pair of the locking faces 26 of the cam 23 to prevent the clockwise rotation of the hub. A pair of solenoids 32 can be actuated to pivot the locking arms 28 away from the cam 23 in order to release it and allow the cam 18 and the bolt head 22 to be rotated clockwise by the motor 19 when desired. It is preferred that, through the provision of compression springs (not shown) in the solenoids 32, the default position of the locking arms 28 is in engagement with the cam 23 as illustrated, whereby in the event of a power failure the hub 18 will continue to be locked against rotation. If the hub 18 is rotated anti-clockwise, the locking arms 28 can ride up over the cam surfaces 25 until they drop into place against the next pair of locking faces 26.

Although there are only two locking arms 28, four locking faces 26 are provided on the cam 23 so that the hub 18 has to be rotated through a maximum of 90° to reach the next locking position. These numbers could be changed so that, for example, the number of locking faces 26 equalled the number of locking arms 28. A single locking arm 28 could be provided but it is preferred to have a pair of arms 28 acting against an even number of locking faces 26 in order to balance the forces on opposite sides of the axis. The locking arms 28 are orientated to be generally tangential to the cam 23 so that the forces on them resisting clockwise rotation of the cam 18 act generally along the length of the arms 28 and are borne by the pivotal mounts 34, not by the solenoids 32. Preferably the ends 30 of the locking arms are slightly wedge-shaped and the locking faces 26 inclined slightly forwards so that any clockwise rotational force on the hub 18 urges the locking arms 28 into closer engagement with the cam 23.

During an individual test of a rotary tool, the locking mechanism adopts the locked configuration illustrated in FIG. 5. As the nut 4 is rotated clockwise on the threaded shaft 1 (as viewed from above) to tighten the test joint, the locking arms 28 resist clockwise turning of the hub 18 and hold the bolt head 22 stationary while the nut 4 advances along the thread of the shaft 1. At the end of the test, the axial clamping force on the test joint is released, for example by moving or relaxing the reaction points 9 of the spring beams 8 as described in the prior art. The solenoids 32 are then actuated to retract the locking arms 28 from the cam 23 and the motor 19 is operated to drive rotation of the hub 18 and bolt head 22 in the clockwise direction (again, as viewed from above). This causes the bolt to unscrew from the nut 4, which is held against rotation because it remains engaged with the tool under test. As the bolt unscrews from the nut, the distance between the bolt head 22 and the nut 4 must increase. The bolt head 22 cannot move downwards because it is held in the recess 20 of the hub 18 so instead the nut 4 moves upwards under the influence of the rotating threaded shaft 1 to resume its position at the start of the test. The solenoids 32 can then be switched off to allow the locking arms 28 to re-engage with the cam 23. Before the start of the next test, the hub 18 may need to rotate through up to 90° further in the clockwise direction before the locking arms 28 and locking faces 26 engage and hold the bolt head 22 stationary again so that the test joint can begin to be tightened.

As just described, the resetting of the test joint can all be carried out automatically and rapidly by the actuation of the solenoids 32 and the motor 19, while the rotary tool is held stationary in engagement with the nut 4. This allows a large number of repetitions of the test to be carried out in quick succession, with minimal effort on the part of the operator.

The illustrated locking and release mechanism is for a conventional right-hand screw thread in the test joint. For a left-hand screw thread, a mirror image mechanism would have to be used and all references to clockwise and anticlockwise in the foregoing description would have to be interchanged.

The foregoing description of FIG. 5 relates to the arrangement of FIG. 1, in which the rotary element of the test joint acted on by the tool under test is a nut 4; and the stationary element is a bolt, of which the head 22 is held in the recess 20 of the hub 18. However, the locking and release mechanism of FIG. 5 can also operate without modification with the alternative arrangement of test joint known from the prior art, in which the rotary element of the test joint acted on by the tool is a bolt; and the stationary element that is held in the recess 20 of the hub 18 is a nut through which the shaft of the rotary bolt is threaded. The operation of the locking and release mechanism is just as previously described and the relative movement of the fastener components is also as described, except that in this case the threaded shaft rotates and translates integrally with the rotary component, rather than remaining stationary. If the end of the bolt shaft needs to extend fully through the stationary nut, it can be given space to do so, for example by forming the recess 20 with an annular shoulder on which the nut can rest and a central well that can be penetrated by the end of the shaft. As before, it is possible in principle to form the stationary component of the fastener integrally with the hub 18—in this case as a threaded bore instead of a nut that is mounted in a recess—but in practice this would mean that the entire hub 18 had to be replaced when the thread became worn.

A further aspect of the invention relates to a method of operating the test apparatus and in particular of adjusting it to compensate for differences between the expected and the measured torque rate of each test joint. As previously explained, the variable torque rate test joint aims to provide a torque that increases with the angle through which the nut 4 is turned according to a predefined torque rate. The increasing torque is developed by the application of an axial force from the spring beams 8 through the collar 7 to the nut 4. The axial force resists the turning of the nut 4 through friction between the collar 7 and nut 4. The frictional force may vary over time, for example as a result of the nut and collar surfaces becoming worn smooth through repeated use of the test joint, and this will cause changes in the torque rate. The torque rate may also vary with temperature, for example through differential thermal expansion of the various components, which affects the angle through which the fastener must be turned in order to tighten the joint fully.

The torque measurement device, such as a CHECK-STAR™ device, that is typically inserted between the tool under test and the nut 4 gives a reading of torque against which the tool can be calibrated. However, some such devices are also capable of measuring the angle through which the tool is turned. The two measurements can be combined to generate a reading of the actual torque rate of the test joint. In fact, the device generates a stream of measurements as a single test progresses but the pairs of torque and angle measurements during the test can be combined using well known statistical techniques to generate a suitably representative reading for the overall performance of the test joint.

If the measured torque rate differs from the desired torque rate for the test, the position of the pivot 10 may be adjusted to harden or soften the joint as appropriate for the next test intended to be under the same conditions. The necessary adjustment may be stored in memory for future uses of the apparatus at the same level of desired torque rate. It may also be used to build a model of the test joint under various conditions of age, temperature and desired torque rate, from which adjustments under other conditions may be predicted.

The method of adjusting the test apparatus just described relies on the torque measurement device also measuring the angle through which the tool is turned. In one previously described aspect of the present invention, a torque sensor 14 built into the shaft of the test joint is used instead of a separate torque measurement device between the test joint and the tool. If the adjustment method is to be used with that arrangement, alternative means for measuring the angle turned by the tool must be provided. For example, an angle encoder ring could be attached to the rotary component of the test joint. Although the angle encoder ring would have to move with the rotary component, its moment of inertia would still be less than that of a torque measurement device.

Figure 7:
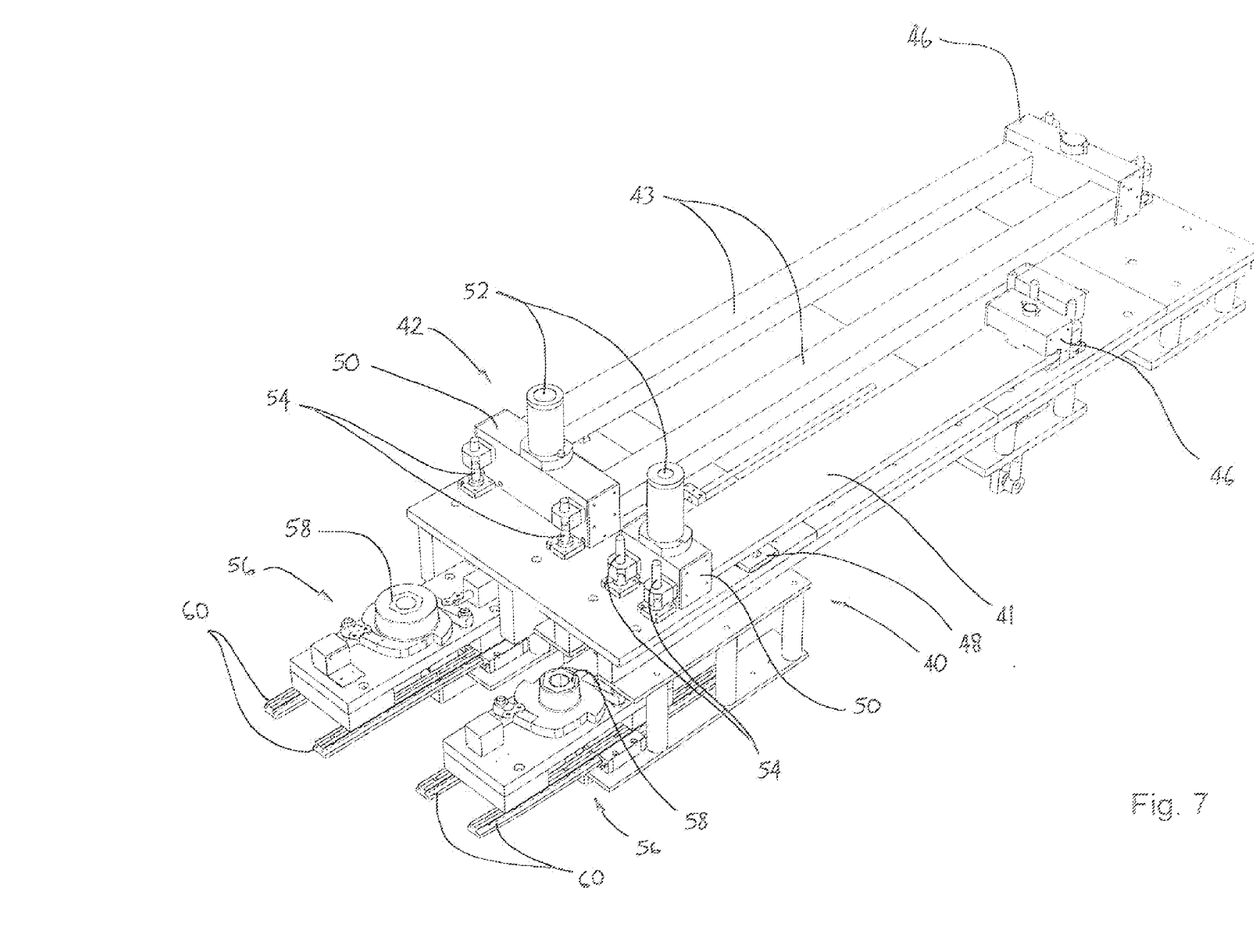
FIG. 7 is a perspective view of test apparatus according to the invention, which incorporates two test joints, each with its own locking and release mechanism.

FIG. 7 shows how some of the aforementioned aspects of the invention may be combined in a practical joint rate simulator apparatus. The apparatus comprises two test joints. In this example (unlike FIG. 1) each test joint is of the kind in which the tool acts on a rotary bolt to screw it into a stationary nut. The front test joint 40 is for testing tools up to a torque of 250 Nm and has a single, broad spring beam 41. The rear test joint 42 is for testing tools up to a torque of 2500 Nm and has a pair of spring beams 43. Each spring beam 41,43 is clamped by a reaction member 46 at one end, is cantilevered over a pivot member 48 and engages with a collar 50 at its free end. The engagement between the beam 41,43 and the collar 50 is via rounded dowel pins (not visible in the drawing) that can transmit force from the beam to the collar only in the vertical direction. In this example, each collar 50 takes the form of a block that surrounds an unthreaded bore 52 through which the bolt shaft (not shown) of the test joint may be freely passed. The collars 50 are constrained to move in a generally vertical direction by guide posts 54.

Each test joint 40,42 has an associated locking and release mechanism 56, as shown in more detail in FIGS. 5 and 6. In the hub of each locking and release mechanism is mounted the nut 58 of the test joint. In FIG. 7, the locking and release mechanisms are shown displaced from their working positions along generally horizontal rails 60, whereby the nuts 58 can be easily replaced. In order to operate the test joints 40,42, the locking and release mechanisms 56 would be slid along the rails 60 until the nuts 58 were aligned below the bores 52. The bolts of the test joints could then be passed through the bores 52 and threaded into the nuts 58 ready for testing to begin.

The invention claimed is:

1. A variable torque rate test joint for the testing of rotary tools for threaded fasteners, comprising:
    a first element having an externally screw threaded shaft;
    a second element having an internally screw threaded bore;
    the screw threads of the first and second elements being engaged with one another so that relative rotation between the first and second elements can be effected by a tool under test; and
    means for exerting a variable force between the first and second elements in the axial direction of the shaft in order to vary the torque rate of the test joint, the force-exerting means comprising:
        a collar encircling the shaft and engaging one of the first and second elements;
        at least one spring beam mounted at a reaction point, cantilevered over a pivot point and engaging the collar so as to exert a force on the collar in the axial direction; and
        means for varying the distance between the pivot point and the central axis of the shaft in order to vary the axial force exerted by the spring beam on the collar;
    characterized in that:
    the first element is fixed against rotation during testing of a tool;
    the second element is a nut mounted for rotation on the shaft of the first element when acted on by a tool under test.

2. A variable torque rate test joint according to claim 1, wherein the first element is a bolt comprising the threaded shaft and a bolt head, the bolt head being fixed against rotation during testing of a tool.

3. The variable torque rate test joint according to claim 2, further comprising a rotary hub in which the bolt head is received; and locking means for holding the hub stationary during the testing of a tool.

4. The variable torque rate test joint according to claim 3, further comprising means for releasing the locking means and means for rotating the hub and the bolt head to reset the test joint at the end of a test.

5. The variable torque rate test joint according to claim 1, comprising a pair of the spring beams that extend alongside one another and that engage the collar on diametrically opposite sides of the shaft.

6. The variable torque rate test joint according to claim 5, wherein the two spring beams are cantilevered over a common pivot member or wherein the two spring beams are cantilevered over two pivot members that are mounted on a common carriage.

7. The variable torque rate test joint according to claim 1, comprising a single spring beam that is bifurcated at its free end to engage the collar on diametrically opposite sides of the shaft.

8. The variable torque rate test joint according to claim 1, wherein at least one spring beam comprises a strain gauge mounted thereon.

9. The variable torque rate test joint according to claim 8, further comprising means for converting measurements by the strain gauge into readings of clamping force in the test joint.

10. The variable torque rate test joint according to claim 1, wherein a torque sensor is mounted on the shaft of the first element for measuring the torque imparted to the shaft by a tool under test.

11. The variable torque rate test joint according to claim 10, wherein the torque sensor comprises at least one strain gauge.

12. The variable torque rate test joint according claim 10, wherein the shaft of the first element comprises a disposable part carrying the screw thread and a permanent part carrying the torque sensor.

13. A variable torque rate test joint for the testing of rotary tools for threaded fasteners, comprising:
    a first element having an externally screw threaded shaft;
    a second element having an internally screw threaded bore;
    the screw threads of the first and second elements being engaged with one another so that relative rotation between the first and second elements can be effected by a tool under test; and
    means for exerting a variable force between the first and second elements in the axial direction of the shaft in order to vary the torque rate of the test joint, the means comprising:
        a collar encircling the shaft and engaging one of the first and second elements;
        at least one spring beam mounted at a reaction point, cantilevered over a pivot point and engaging the collar so as to exert a force on the collar in the axial direction; and
        means for varying the distance between the pivot point and the central axis of the shaft in order to vary the axial force exerted by the spring beam on the collar;
    characterized in that:
    one of the first and second elements is a rotary element that is rotated by a tool under test; and
    the other of the first and second elements is a stationary element that is fixed against rotation by a locking mechanism while a tool is being tested;
    wherein the locking mechanism can be disengaged at the end of a test to allow rotation of the stationary element.

14. The variable torque rate test joint according to claim 13, further comprising drive means for rotating the stationary element at the end of a test to reset the test joint to a starting condition.

15. The variable torque rate test joint according to claim 13, further comprising a rotatable hub in which the stationary element is received, the locking mechanism engaging the hub to prevent its rotation during a test.

16. The variable torque rate test joint according to claim 15, wherein the locking mechanism comprises a locking arm that can be pivoted into or out of engagement with a rim of the hub.

17. The variable torque rate test joint according to claim 16, wherein the rim of the hub comprises a cam that has an alternating sequence of cam surfaces and locking faces, the locking faces being disposed for engagement with the locking arm.

18. The variable torque rate test joint according to claim 17, wherein the locking arm lies generally tangential to the hub when it engages one of the locking faces.

19. The variable torque rate test joint according to claim 18, wherein each locking face of the cam faces somewhat radially inwards to help maintain the locking arm in engagement with it.

20. The variable torque rate test joint according to any of claims 16, comprising a pair of the locking arms on opposite sides of the hub.

21. A method of testing a rotary tool for threaded fasteners in a variable torque rate test joint that comprises:
   a first element having an externally screw threaded shaft;
   a second element having an internally screw threaded bore;
   the screw threads of the first and second elements being engaged with one another so that relative rotation between the first and second elements can be effected by a tool under test; and
   means for exerting a variable force between the first and second elements in the axial direction of the shaft in order to vary the torque rate of the test joint, the force-exerting means comprising:
      a collar encircling the shaft and engaging one of the first and second elements;
      at least one spring beam mounted at a reaction point, cantilevered over a pivot point and engaging the collar so as to exert a force on the collar in the axial direction; and
      means for varying the distance between the pivot point and the central axis of the shaft in order to vary the axial force exerted by the spring beam on the collar;
   the method comprising:
      holding a stationary one of the first and second elements fixed against rotation by a locking mechanism;
      carrying out a test of a tool by using it to rotate the other, rotary one of the first and second elements; and
      at the end of the test, disengaging the locking mechanism and rotating the previously stationary element to reset the test joint.

22. The method of testing a rotary tool according to claim 21, further comprising:
   keeping the tool engaged with the rotary element while the previously stationary element is rotated to reset the test joint.

23. A method of adjusting a variable torque rate test joint that comprises:
   a first element having an externally screw threaded shaft;
   a second element having an internally screw threaded bore;
   the screw threads of the first and second elements being engaged with one another so that relative rotation between the first and second elements can be effected by a tool under test; and
   means for exerting a variable force between the first and second elements in the axial direction of the shaft in order to vary the torque rate of the test joint, the means comprising:
      a collar encircling the shaft and engaging one of the first and second elements;
      at least one spring beam mounted at a reaction point, cantilevered over a pivot point and engaging the collar so as to exert a force on the collar in the axial direction; and
      means for varying the distance between the pivot point and the central axis of the shaft in order to vary the axial force exerted by the spring beam on the collar;
   the method of adjusting the test joint being characterized by the steps of:
   measuring the relative rotation between the first and second elements of the test joint during a test;
   measuring the torque applied to the test joint during the test;
   deriving an actual torque rate from the measured rotation and the measured torque; and
   adjusting the distance between the pivot point and the central axis of the shaft to compensate for any error between the actual torque rate and a desired torque rate.

24. The method of adjusting a variable torque rate test joint according to claim 23, the method further comprising storing the actual torque rate or the amount of adjustment required in a memory for use in future tests.

25. The method of adjusting a variable torque rate test joint according to claim 24, the method further comprising feeding the actual torque rate into a model of the behaviour of the test joint under different conditions.

26. The method according to claim 23, wherein the step of measuring the relative rotation between the first and second elements of the test joint comprises fixing the first element against rotation; and measuring the rotation of the second element about the shaft of the first element.

27. The method according to claim 26, wherein the first element is a bolt comprising the threaded shaft and a bolt head, the bolt head being fixed against rotation during testing of a tool; and wherein the second element is a nut mounted for rotation on the threaded shaft the bolt.

28. The method according to claim 23, wherein the step of measuring the torque applied to the test joint is carried out using a torque sensor mounted on the shaft of the first element.

29. The method according to claim 28, wherein the torque sensor comprises at least one strain gauge.

30. The method according to claim 29, wherein the torque sensor comprises a pair of strain gauges.

31. The method according to claim 23, further comprising using a strain gauge mounted on the cantilevered part of the spring beam to measure the axial force exerted by the spring beam on the collar.

* * * * *